(12) United States Patent
Ker et al.

(10) Patent No.: US 7,467,040 B2
(45) Date of Patent: Dec. 16, 2008

(54) METHOD OF REAL TIME-ESTIMATION OF INDICATORS OF THE COMBUSTION STATE OF AN INTERNAL-COMBUSTION ENGINE

(75) Inventors: Stéphan Ker, Chatou (FR); Laurent Duval, Nanterre (FR)

(73) Assignee: IFP, Rueil Malmaison Cedex (FR)

( * ) Notice: Subject to any disclaimer, the term of this patent is extended or adjusted under 35 U.S.C. 154(b) by 0 days.

(21) Appl. No.: 11/845,819

(22) Filed: Aug. 28, 2007

(65) Prior Publication Data

US 2008/0051975 A1 Feb. 28, 2008

(30) Foreign Application Priority Data

Aug. 28, 2006 (FR) .................................. 06 07602

(51) Int. Cl.
*F02D 28/00* (2006.01)
(52) U.S. Cl. .................. 701/102; 701/111; 123/406.38; 73/35.08
(58) Field of Classification Search ................. 701/102, 701/103, 111, 115; 123/406.26, 406.27, 123/406.28, 406.29, 406.37, 406.38; 73/35.07, 73/35.08
See application file for complete search history.

(56) References Cited

U.S. PATENT DOCUMENTS

| | | | | |
|---|---|---|---|---|
| 5,115,779 A | * | 5/1992 | Itoyama .................. | 123/406.35 |
| 5,483,936 A | * | 1/1996 | Kerstein et al. .......... | 123/406.16 |
| 5,598,822 A | * | 2/1997 | Fujishita et al. ......... | 123/406.38 |
| 5,905,193 A | * | 5/1999 | Hashizume et al. ........ | 73/35.09 |
| 6,012,425 A | * | 1/2000 | Unland et al. ........... | 123/406.38 |
| 6,246,952 B1 | | 6/2001 | Honda | |
| 6,789,409 B2 | * | 9/2004 | Tanaya ................. | 73/35.08 |
| 6,862,517 B2 | * | 3/2005 | Galtier ................. | 701/111 |
| 7,027,910 B1 | * | 4/2006 | Javaherian et al. ........ | 701/111 |
| 7,055,372 B2 | * | 6/2006 | Daniels et al. .......... | 73/35.08 |
| 7,181,338 B2 | * | 2/2007 | Takemura et al. ......... | 701/111 |
| 7,254,475 B1 | * | 8/2007 | Grai et al. ............. | 701/111 |
| 7,383,816 B2 | * | 6/2008 | Zurlo .................. | 123/406.3 |
| 2003/0164156 A1 | | 9/2003 | Galtier | |

FOREIGN PATENT DOCUMENTS

| | | |
|---|---|---|
| DE | 102 01 073 A1 | 7/2003 |
| FR | 2 834 789 | 7/2003 |
| FR | 2 844 302 | 3/2004 |
| JP | 11 303673 A | 11/1999 |
| WO | WO 03/001175 A1 | 1/2003 |

OTHER PUBLICATIONS

Eric Jacobsen, Richard Lyons: "The Sliding DFT", IEEE Signal Processing Magazine, vol. 20, No. 03, Mar. 2003, pp. 74-80, XP002427289, ISSN: 1053-5888.

* cited by examiner

*Primary Examiner*—Willis R. Wolfe, Jr.
*Assistant Examiner*—Johnny H. Hoang
(74) *Attorney, Agent, or Firm*—Antonelli, Terry, Stout & Kraus, LLP.

(57) ABSTRACT

A method of real-time estimation of indicators of the engine combustion state from signals containing oscillating components. A signal, such as a vibration signal for example, correlated with the engine combustion, is acquired as a function of time or of the crank angle. Real-time filtering and time-frequency analysis of this signal is carried out and indicators of the combustion state are estimated in real time from this analysis. The method has application for combustion control of an internal-combustion engine.

20 Claims, 3 Drawing Sheets

METHOD OF REAL TIME-ESTIMATION OF INDICATORS OF THE COMBUSTION STATE OF AN INTERNAL-COMBUSTION ENGINE

BACKGROUND OF THE INVENTION

1. Field of the Invention

The present invention relates to a method of real-time estimation of indicators of the combustion state of an internal-combustion engine equipped with one or more detectors.

2. Description of the Prior Art

Emissions reduction standards have led to a progressive adaptation of engine technologies such as the introduction of additional actuators (exhaust gas recirculation valve, direct electronic injection, variable-geometry turbine) and new combustion modes (homogeneous diesel combustion or stratified gasoline combustion). In this context, the engine has become an assembly of complex systems requiring management by means of modern automation techniques. The engine control function consists in managing the available actuators so as to guarantee engine performances while meeting environmental constraints. A fundamental aspect of engine control lies in the combustion control system via precise management of the thermodynamic conditions in the cylinder (temperature, boost pressure, composition of the mixture admitted) and of the adjustment of the injection parameters.

The new combustion modes, such as homogeneous diesel combustion, are much less polluting than conventional combustions (gasoline or diesel), but they are, on the other hand, much more sensitive to working conditions. They therefore involve an additional investment in terms of regulation. Loop combustion control is possible only if information is available on the combustion progress and if it can be influenced through the agency of the actuators available. This information (indicators) can be obtained from direct measurement of the pressure in the combustion chamber by means of a specific detector. This method allows direct access of physical indicators of the combustion but, because of the life and cost of this type of detectors, they cannot be standard at this time in vehicles. To date, it is more realistic to turn towards alternative techniques such as the estimation of combustion state indicators from non-intrusive measurements. A synthesis of the existing methods is presented below:

Ionization current interpretation: The principle measures the ionization current generated during combustion. During this combustion, some chemical reactions cause release of ions. Their production is influenced by the temperature and pressure conditions in the cylinder. To detect them, the plug is permanently supplied with a low-amplitude voltage. The ionization current contains information on the successive combustion stages: ignition, flame front propagation and a stage associated with the pressure and temperature variations at the end of the reaction. Eriksson and Nielsen have shown in the document mentioned below, for example, that the maximum pressure during a cycle and its argument can be identified by interpreting the ionization current:

L. Eriksson, *Spark Advance Modeling and Control*, Ph.D. thesis, Linköping University, Sweden, 1999.

Analysis of the instantaneous rotating speed of the crankshaft: The speed is measured by means of an encoder mounted at one end of the crankshaft. The cylinder pressure is reconstructed by inversion of the kinematic chain of the engine, the model thereof being of course known. The following document can be referred to for example:

S. J. Citron, J. E. O'Higgins & L. Y. Chen, Cylinder by Cylinder Engine Pressure and Pressure Torque Waveform Determination Utilizing Speed Fluctuations, SAE Paper (1989), no. 890486.

Reconstruction from engine vibration measurements: The vibrations of an internal-combustion engine can be measured by means of a detector referred to as accelerometer or of a knock detector mounted on the engine. It can be noted that an accelerometer is a detector that, in a given reference system, measures the acceleration of the body to which it is fastened (or one of its components) and allows the resulting impacts and vibrations to be studied. Extraction of coherent combustion state indicators from an accelerometer is difficult because of the nature of the signal delivered. In fact, this signal does not only contain information on the combustion because the vibratory response of the engine is also due to other events, such as injection nozzle chattering, piston return stroke to the top dead center, vibrations induced by the distribution system, etc.

Using accelerometer type detectors to estimate the cylinder pressure is a known technique. The following documents, wherein the cylinder pressure is to be estimated from the signal delivered by the accelerometer, can be mentioned for example:

Y. Gao & R. B. Randall, *Reconstruction of Diesel Engine-Cylinder Pressure Using a Time Domain Smoothing Technique*, Mechanical Systems and Signal Processing 13 (1999), no. 5, 709-722.

H. Du, L. Zhang & X. Shi, *Reconstructing Cylinder Pressure from Vibration Signals Based on Radial Basis Function Networks*, Proceedings of the Institution of Mechanical Engineers, Part D 215 (2001), 761-767.

R. Johnsson, *Cylinder Pressure Reconstruction Based on Complex Radial Basis Function Networks from Vibration and Speed Signals*. Mechanical Systems and Signal Processing, 2006.

Du et al. deal with the cylinder pressure estimation problem by means of signal processing techniques involving deconvolution or inverse filtering. They have shown the capacity of a neural network to carry out an approximation of the non-linear transfer function between the evolution of the cylinder pressure and the vibration signal generated. Johnsson uses a similar method according to which the signal delivered by the accelerometer is combined with the engine speed signal to reconstruct the pressure signal and the combustion state indicators by means of a neural network whose inputs are imaginary variables.

Other methods using accelerometric detectors for controlling the combustion of an engine are also known:

EP Patent 1,116,946 describes a method and a system for controlling the combustion from signals delivered by an accelerometer, according to which the signal measured is windowed (combustion occurrence period). This signal is then processed during each control loop and it is compared with a reference signal in order to determine the changes to be brought to the combustion state indicators. Processing the signal from the accelerometer comprises three main stages: rectification, filtering and integration.

U.S. Patent Published application 2,004,267,430 (WO-05, 001,263) describes a method of processing accelerometric signals resulting from the vibrations of an internal-combustion engine. In particular, the signals are filtered by spectral filters and the combustion analysis curve is reconstructed by deconvolution of a transfer function identified from an experimental database. The result is an estimation of the combustion state indicators allowing combustion control. For example, the parameter referred to as SoC (Start of Combustion) is estimated from a polynomial depending on the energy release, its maximum angle and the boost pressure.

German Patent 19,536,110 (FR-2,739,414) describes a method of processing accelerometric signals resulting from vibrations for controlling the combustion of a diesel engine. In particular, the signals are filtered in two different frequency bands. The first frequency band [10 kHz, 30 kHz] allows extraction of components associated with the injection by means of a thresholding device. The second frequency band (0.5 kHz, 4 kHz) allows extraction of the signal components generated by the combustion using an identical thresholding method.

U.S. Pat. No. 6,546,328 describes a method using a wavelet transform allowing a priori to locate combustion state indicators like the method provided.

French Patent 2,834,789 describes a knock signal processing method. The method adjusts the acquisition sampling frequency to the engine speed. A Fourier transform is calculated for the various sampling value groups for a frequency of interest. The information on combustion results from the summation of the Fourier transform results.

Fourier transforms are widely used in many fields, including processing of accelerometric data associated with engine diagnosis and control. Examples in the recent literature are U.S. Pat. No. 6,388,444 describing the use of such tools to detect combustion misfires, U.S. Pat. No. 6,456,927 or U.S. Published Patent Application US-2004/0,162,668 describing the use of Fourier transforms for engine knock detection. These patents use windowing of the accelerometric signal, band pass filtering (U.S. Published Patent Application 2006/0,085,119 for example). Such a use for the purpose of diesel or gasoline engine control is also known from U.S. Pat. No. 6,976,936 for example.

After preprocessing, the Fourier transform can be used in form of a fast Fourier transform (FFT), a fast known algorithm, calculated on all of the samples, from which indicators are obtained by means of a calculation involving the amplitude or the energy of components of the Fourier spectrum thus calculated, and sometimes an amplitude or energy integration (U.S. Published Patent Application 2006/0,085,119).

Another method, described in U.S. Published Patent Application 2004/0,267,430, uses a variant of the Fourier transform, the spectral decomposition (involving several FFTs) to extract a parameter, referred to as SoC (Start of Combustion), after integration of a filtered accelerometric signal. The latter first calculates a mean on different acquired cycles. Another example of use of spectral decomposition for reconstructing a pressure signal from an accelerometric signal is given in U.S. Pat. No. 6,408,819.

The indicators from the aforementioned approaches cannot be used directly for applications linked with internal-combustion engine diagnosis and control. These methods are based on a temporal integration of a signal delivered by an accelerometer. Processing of the signal from the accelerometer is not carried out in real time. Furthermore, these methods greatly depend on the nature of the combustion and/or on the technology of the detector used. Their field of application is therefore limited.

The method according to the invention allows real-time estimation of the indicators of the combustion progress of an internal-combustion engine equipped with one or more detectors, whatever the detector technology used and whatever the nature of the combustion.

SUMMARY OF THE INVENTION

The invention relates to a method for determining indicators of the combustion state of an internal-combustion engine, wherein a signal correlated with the combustion phenomenon is acquired in a form of a series of samples. According to the invention, estimation of combustion state indicators can be used within the context of combustion control of an internal-combustion engine by modifying the engine parameters depending on the evolution of the indicators obtained with this method.

In this method, a frequency band correlated with the combustion is determined by carrying out a signal time-frequency analysis, and a number k of frequencies belonging to this frequency band is selected. The method comprises the following stages:

a) after acquisition of a first sequence of N first samples $[n_1, \ldots n_N]$:

filtering said first sequence in said frequency band, by means of a band pass filter, estimating at least k spectral components of said first sequence thus filtered by carrying out a discrete Fourier transform of the first filtered sequence;

b) then, for each new sample $n_{N+1}$, constructing a new sequence of N samples $[n_2, \ldots n_{N+1}]$, consisting of the samples of the first sequence except first sample $n_1$ but with said new sample $n_{N+1}$;

filtering the new sequence in said frequency band, by means of a recursive band pass filter;

estimating at least k spectral components of the new sequence thus filtered, by means of a discrete Fourier transform of the new sequence filtered, calculated by applying the circular shift property of said Fourier transform;

c) determining combustion state indicators from the estimated spectral components.

According to the method, the combustion state indicators can be determined after acquisition of a number p of sequences, from the following stages:

defining, for each sequence, a value combining the spectral components;

determining an extremum of the p values combining the spectral components of the p sequences; and determining the combustion state indicators from the extremum.

In this case, the sum of the energies of the spectral components of a sequence can be used as the spectral component combination value.

According to the invention, the signal can be acquired as a function of time or as a function of the crank angle, and generally the number k of frequencies selected ranges between 1 and 10. For the method, various types of signal can be used:

a vibration signal acquired by means of a vibration detector arranged in said engine;

pressure in the engine cylinders, acquired by means of pressure detectors arranged in the engine;

ionization current signal.

The combustion state indicators can represent at least one of the following phenomena: start of the oscillating phenomenon associated with the combustion phase, end of the oscillating phenomenon associated with the combustion phase, energy barycentre of the oscillating phenomenon, magnitude of the oscillating phenomenon.

Finally, the combustion of an engine can be controlled by modifying engine parameters according to these combustion state indicators.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

The method according to the invention is described within the context of a particular embodiment: the processing of signals containing oscillating components. In this particular embodiment, the method is applied to a single cylinder without integrating any specific characteristics associated with the engine combustion mode (Diesel, Diesel LTC [Low Temperature Combustion] or HCCI [Homogenous Charge Compression Ignition], gasoline, gasoline working in stratified mode, CAI [Controlled Auto Ignition]) and with the technology of the detector(s) used. The nature of the internal-combustion engine and the technology of the detector used, as long as the signal delivered contains oscillating components, do not influence the principle of the method.

The method allows control of the combustion of an internal-combustion engine from a signal delivered by a detector that is acquired according to time or to the crank angle. Part of the frequency content of this signal is associated with the pressure variation within a cylinder during the combustion phenomenon that generates vibrations, inducing oscillations in the acquired signal. The method allows real-time detection of the amplitude increase of the frequency content associated with combustion. This frequency content can be isolated by means of band pass filtering and analyzed by means of a time-frequency representation in order to access, via the oscillating phenomenon analyzed, information on the progress of the combustion.

In order to be able to carry out this time-frequency analysis in real time, the method only takes into account a very limited number of discrete frequencies belonging to the frequency band of interest. The method uses the discrete Fourier transform and its circular shift property in order to determine the spectral components of the signal according to time or to the crank angle. This time-frequency analysis provides a characteristic distribution of the spectral components that varies with time or with the crank angle. The form of this distribution is exploited in order to extract indicators qualifying the progress of the combustion.

This method can be applied within the context of engine control by modifying the engine parameters according to the evolution of the indicators obtained from this method and describing the combustion.

Figure 1:
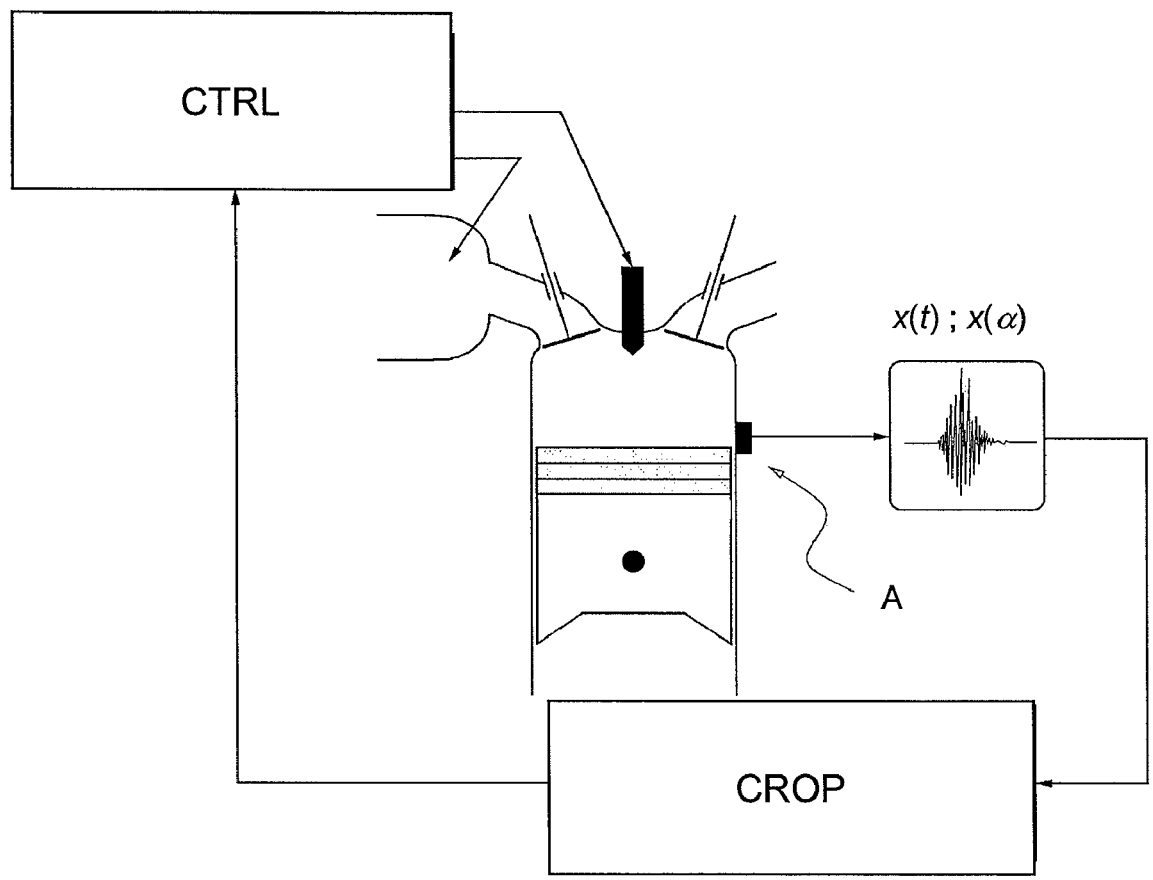
FIG. 1 is the flowsheet of the loop combustion control according to the invention.

FIG. 1 illustrates the general principle of the loop combustion control method according to the invention. A signal x containing oscillating components (for example from an industrial or instrumentation pressure detector, an accelerometric detector or an ionization current detector) is acquired as a function of time, x(t), or of the crank angle, x(□). This signal contains oscillating components whose frequencies are associated with the evolution of the pressure gradient in the combustion chamber during the combustion phenomenon. The method analyzes in real time the evolution of the spectral components of these frequencies according to time or to the crank angle. The distribution of these spectral components allows extraction of indicators in real time, which will be used to control the combustion. The method can be broken up into five major stages:

Preliminary Stage:

Stage 1—Identification of the frequency band associated with the combustion phenomenon Stages Carried Out in Real Time:

Stage 2—Acquisition of a signal x from a detector (A) according to time or to the crank angle Stage 3—Isolation of one or more frequency bands of interest and determination of the spectral components Stage 4—Determination of combustion state indicators (CROP) by means of the evolution of the spectral components Stage 5—Engine control: Adjustment of the engine parameters for combustion regulation (CTRL)

Stage 1: Identification of the Frequency Band Associated with the Combustion Phenomenon The combustion phenomenon, characterized by an evolution of the pressure gradient in the cylinder, generates vibrations that are transmitted to the block and that can be recorded by means of a detector, an accelerometer for example. The frequency content of the oscillations recorded, associated with the combustion phenomena, depends on several parameters such as the chamber geometry and the combustion type, but it is located in a frequency band generally below 30,000 Hz.

The vibration signal delivered by the accelerometer is a superposition of undulatory phenomena. Examples of these phenomena are combustion, the injection nozzles, the piston return stroke or the noise. In order to separate these various phenomena, a time-frequency analysis allowing visualization of the information contained in the signal containing oscillating components with a two-dimensional representation is carried out. These two dimensions are, on the one hand, time or the crank angle and, on the other hand, the dual variable thereof, which is the frequency, i.e. the inverse of time or of the crank angle. The interest of this time-frequency representation is that it allows identification of an event from its frequency content and its chronology.

According to the method, acquisition of signals containing oscillating components, a vibration signal for example, is thus performed and a time-frequency analysis is carried out in order to precisely locate the frequency band correlated with the combustion phenomena.

In practice, several types of time-frequency representations can be used to study the vibration signal. The spectrogram type representation, which analyzes the signal by carrying out a Fourier transform in a sliding window, along the time (or crank angle) axis, can be mentioned. The evolution of the spectral components of the signal as a function of time or of the crank angle is thus obtained. Visualization of the evolution of these components is achieved by means of a diagram where the modulus of the spectral components is represented. One of the axes is time (or the crank angle) and the other one is the dual variable, the frequency.

A single method allows analysis of a reference signal and the vibration signal used according to the invention. The reference signal oscillations that can also be observed on the signal considered are located. This is done for one or more signals representative of the combustion phenomenon, for example at several engine speeds, loads, according to our knowledge of engines. After this vibration signal analysis work, the frequency content associated with combustion is thus determined by combining the knowledge of the physical parameters of the engine (notably the combustion chamber dimensions and the operating temperature range of the engine considered) with a joint analysis, according to the time-frequency representation considered, between the reference signal (for example the pressure signal in the combustion chamber, acquired with the suitable detector) and the acquired signal considered (a vibration signal for example).

Stage 2: Acquisition of the Signal Containing Oscillating Components According to Time or to the Crank Angle This stage, and all the stages that follow, are carried out in real time. The first real-time phase of the method records the signal containing oscillating components by means of a detector (for example an accelerometer located on the engine block or the cylinder head). The detector technology does not matter much. One however has to make sure that the detector is well suited to the signal containing oscillating components to be recorded, that is it has a band pass including the desired frequency content and no major distortion disturbs the signal.

Two quantities have to be recorded: the first one is the signal delivered by the detector, the second is the value of the crank angle as a function of time, which is obtained by means of an angle encoder.

It is then decided to work with either a sampling as a function of time, or a sampling as a function of the crank angle. The method can involve working indiscriminately according to time or to the crank angle, but the crank angle must be obtained in both cases in order to provide in fine an angular dating, that is conversion to angular values of part of the indicators provided by the method. The angular values obtained are used for control purposes, either in an absolute manner or in a manner relative to 1) the indicators obtained during the previous combustion cycles 2) mappings. They are used in loop combustion control, by modifying the engine parameters, some of which are specified by an angular value (for example injection nozzle opening, or the action of the exhaust or intake valves).

Stage 3: Isolation of the Frequency Band of Interest and Determination of the Spectral Components The signal is processed sample by sample to ensure real-time functioning of the method. This stage is broken up into two phases that are carried out one after the other: signal filtering and time-frequency analysis.

Signal Filtering

The first phase isolates the frequency band of interest, and notably the oscillating components associated with the combustion phenomenon. A recursive band pass filter is therefore used. A band pass filter is mainly characterized by its cutoff frequencies and its order. In order to achieve real-time band pass filtering, the filter is applied in the time or in the angular domain. The following difference formulation is used:

$$a(1)*y(n)=b(1)*x(n)+b(2)*x(n-1)+\ldots+b(nb+1)*x(n-nb)-a(2)*y(n-1)-\ldots-a(na+1)*y(n-na) \quad (1)$$

where x(n) is the input signal for sample n y(n) is the filter output signal for sample n a(1, ..., nb) are the poles of the filter and b(1, ..., nb) are the zeroes of the filter.

A detailed description of this filtering type can be found in the following document: Oppenheim and Schafer, "*Discrete-Time Signal Processing*", 1989.

By way of example, a Butterworth type filter of order 4 and of cutoff frequencies 500 Hz and 2500 Hz can be used. Such a linear filter has a nearly constant gain in the desired band pass.

It is also possible to use, in addition to or instead of the linear filters, recursive non-linear filters, more robust to some types of noise, such as median filtering, described in:

T. Nodes et N. Gallagher, "*Median Filters: Some Modifications and* Their Properties", IEEE Transactions on Acoustics, Speech and Signal Processing, vol. 30, n. 5, pp. 739-746, 1982, as well as its generalizations:

I. Shmulevich et al., "Output Distributions of Recursive Stack Filters", Signal Processing letters, vol. 6, no. 7, pp. 175-178, July 1999.

Time-Frequency Analysis

The second phase of this stage carries out time-frequency analysis of the filtered signal in order to follow the evolution of the spectral components according to time or to the crank angle. According to the method, a time-frequency analysis that does not require much calculation, unlike the method used in stage 1, is performed. In fact, the evolution of the spectral components of a very limited number of discrete frequencies (typically 1 to 10) belonging to the frequency band associated with the combustion phenomenon considered is followed.

The time-frequency analysis used by the method is based on the discrete Fourier transform that, for a frequency k and for a temporal or angular sequence of N samples, provides the spectral component X(k) by the following relation:

$$X(k) = \sum_{n=0}^{N-1} x(n)e^{-2i\pi nk/N} \quad (2)$$

To perform a time-frequency analysis, the signal analysis window (that is the N samples) has to be shifted by a certain number of samples and a new discrete Fourier transform has to be carried out. An evolution as a function of the samples considered (that are either in the time domain or in the angular domain) of the spectral components is thus obtained.

In order to use this technique in real time, analysis is performed as the samples are acquired. This is done by exploiting one of the properties of the discrete Fourier transform, the circular shift property. According to this property, if the discrete Fourier transform of a sequence of samples is X(k), then the discrete Fourier transform of the same sequence, but shifted by a sample, is $X(k)e^{2i\pi k/N}$.

Thus, from the spectral component calculated for the sequence of N samples [$n_1, \ldots n_N$], we can determine the next spectral component of the sequence [$n_2, \ldots n_{N+1}$] by means of the following difference formulation:

$$X_k(n)=X_k(n-1)e^{2i\pi k/N}-x(n-N)+x(n) \quad (3)$$

where:

$X_k(n)$ is the new estimation of the spectral component $X_k(n-1)$ is the previous estimation of the spectral component x(n-N) is the first sample of the sequence used to calculate $X_k(n-1)$.

x(n) is the last sample of the new sequence to be analyzed it is the sample that has just been acquired, the last of the new sequence filtered during the previous phase.

For more details concerning Equation (3), one may refer to the paper by Jacobsen E., Lyons Richard, "*The Sliding DFT*", IEEE Signal Processing Magazine, pp 74-80, March 2003.

In practice, one has to wait for the N first samples to be acquired before the first estimation of the spectral component can be made according to Equation (2), then estimation of the spectral components is performed sample by sample by means of Equation (3).

The number of discrete frequencies is small. It depends on the frequency band associated with the combustion, on the signal sampling frequency and on the number N of the analysis window considered. This window size conditions the solution of the time-frequency analysis. In general terms, one to three discrete frequencies are necessary for a good analysis of the vibration signal.

One asset of this stage is to carry out in the same loop filtering and time-frequency analysis of the vibration signal, thanks to the recursive formulation used for filtering and time-frequency analysis.

If several discrete frequencies have been selected, it can be advantageous to synthesize the information obtained from the time-frequency analysis by means of a suitable combination of the values of the spectral components of these discrete frequencies. By way of example, addition of the modulus to the square of these components can be carried out. This addition represents the sum of the energy of the spectral components. For each analysis window, this energy sum is a characteristic value of the frequencies selected. By way of non limitative example, a synthesis of the information by this sum of the energy of the spectral components is discussed in the description below.

Stage 4: Determination of Combustion State Indicators by Means of the Evolution of the Spectral Components Thus, upon each new sample acquisition, the sum of the energy of the spectral components is calculated. After acquisition of p samples, a curve referred to as distribution curve of the sum of the energy of the spectral components, comprising p values, is obtained. This distribution is estimated for a window comprising the combustion phenomenon for a given cylinder. The size of this window is by definition smaller than the duration of an engine cycle. In other words, the number p of samples acquired defines a window allowing determination indicators of the combustion state during an engine cycle.

Figure 2:
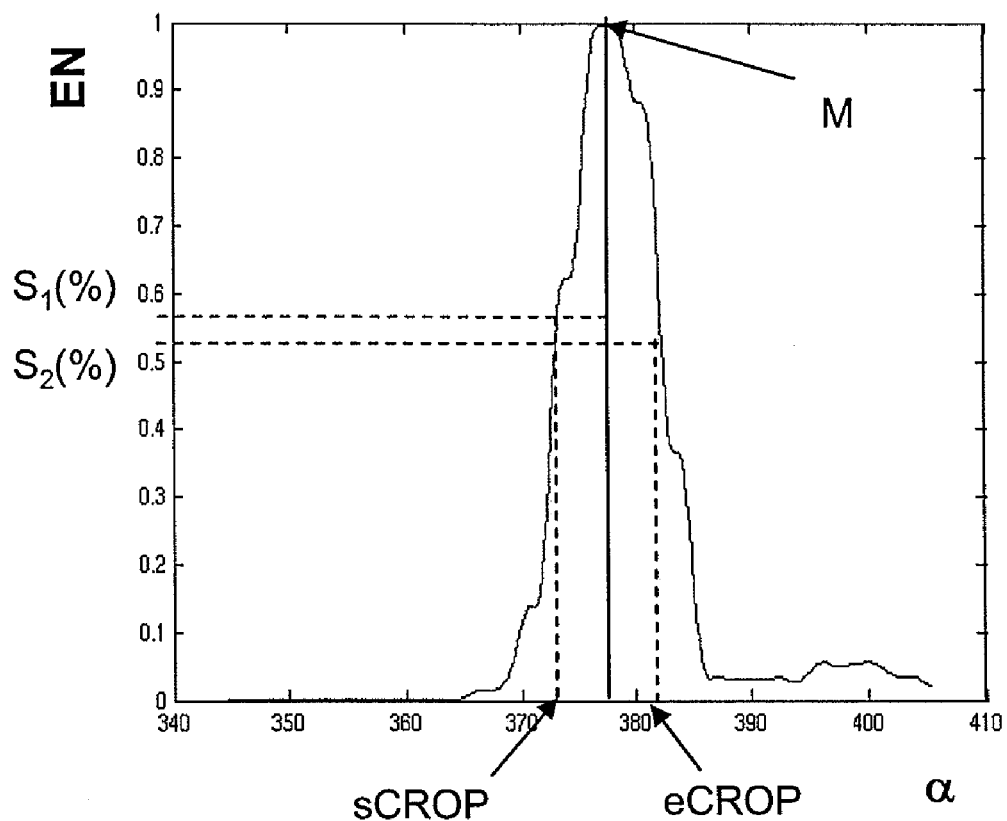
FIG. 2 shows an extraction of the indicators based on determination of the maximum of the time-frequency phenomenon associated with the combustion.

The distribution of the sum of the spectral components energy, as a function of time or crank angle, has a characteristic course. Thus, an increase, then a decrease of this energy is correlated with the combustion phenomenon. The combustion state indicator extraction method is based on seeking the maximum of the sum of the spectral components energy, denoted by M in FIG. 2. This FIG. 2 illustrates the distribution (EN) of the (normalized) sum of the spectral components energy as a function of the crank angle □). Once this maximum identified, four indicators are extracted:

the start of the vibratory phenomenon associated with the combustion phase, referred to as sCROP (Start of Combustion Related Oscillation Phenomenon);

the end of the vibratory phenomenon associated with the combustion phase, referred to as eCROP (End of Combustion Related Oscillation Phenomenon);

the energy barycentre of the vibratory phenomenon, referred to as bCROP (Barycentre of Combustion Related Oscillation Phenomenon);

the magnitude of the vibratory phenomenon, referred to as mCROP (Magnitude of Combustion Related Oscillation Phenomenon).

The parameters sCROP is the time or the angle corresponding to a certain threshold ($S_1$(%)) of the maximum (M) of the sum of the spectral components energy, located before the maximum. Thus, once the maximum is determined from a fixed percentage of this maximum, temporal or angular dating of the sum of the spectral components energy reaching this value sets the parameter sCROP.

The parameter eCROP is the time or the angle corresponding to a certain threshold ($S_2$(%)) of the maximum of the sum of the spectral components energy, located after the maximum. Thus, once the maximum determined and from a fixed percentage of this maximum, temporal or angular dating of the sum of the spectral components energy reaching this value sets parameter eCROP.

The parameter bCROP is the time or the angle contained in the range set by sCROP and eCROP, and corresponding to the position of the barycentre of curve EN (energy distribution) according to the following relation:

$$bCROP = \frac{\sum \text{energy}(n) * dat(n)}{\sum \text{energy}(n)}$$

where:

energy(n) is the energy of the sum of the spectral components energy, dat(n) is the temporal or angular dating.

The parameter mCROP is an energy value calculated from the sum of the spectral components energy between sCROP and eCROP.

For this embodiment example, an information synthesis by a sum of the spectral components energy is considered. An extremum is determined that was the maximum of this energy curve. A minimum could however be identified to determine the combustion state indicators by selecting a different combination of the spectral components without departing from the scope of the invention. The invention selects a remarkable point on the curve, allowing determination of indicators of low noise sensitivity.

Stage 5: Adjustment of the Engine Parameters for Combustion Regulation

Closed-loop control strategies can be implemented on the basis of the combination of, among other things, these four combustion state indicators. They allow identification of cylinder behavior drifts and a suitable corrective action can be carried out in order to regulate these behavior drifts. The problem of multicylinder engine control is often linked with cylinder to cylinder unbalances that controllers based on mappings cannot solve. In fact, a base mapping is applied for each cylinder without taking account of possible variations. Closed-loop regulation provides an additional corrective term suited to the combustion in each cylinder. Cylinder to cylinder drifts can have various origins:

bad distribution of the mass of burnt gas;

variation of the cylinder to cylinder thermics; and pilot injection defect due to an actuator drift.

The aforementioned phenomena form a set of vectors that alter both combustion efficiency and comfort in terms of noise and vibrations. It can be noted that the combustion variation can also change the combustion profile and that, in this case, the adjustment values contained in the injection mappings lapse. The combustion state indicators are used to compensate for fuel characteristic variations or cylinder to cylinder unbalances.

By way of example, two control strategies using combustion state indicators are presented hereafter.

Noise control system: The noise generated by combustion can, if it exceeds certain threshold values, affect the vehicle driving comfort and it has to meet certain environmental standards. Control of the mass of fuel introduced, for example during a pilot injection, influences this noise. It is also possible to change the time of combustion start by varying the mass of burnt gas re-introduced into the cylinder. In this case, it is parameter mCROP that gives information on the noise level of each cylinder, it is therefore the ideal parameter when considering feedback control.

Combustion timing adjustment: Combustion timing is an essential component because it is taken into account for optimization of the combustion efficiency and of the emissions. In this precise case, sCROP, bCROP and mCROP are ideal candidates when considering looping the injection advance since they are representative of the combustion timing.

APPLICATION EXAMPLE

A straight four-cylinder engine was equipped with an accelerometric detector positioned on the engine block. A platform allows on-line data acquisition and processing.

Determination of the Frequency Band of Interest

The frequency band associated with the combustion phenomenon is determined between 0 and 2 kHz by means of a time-frequency analysis.

Methodology Application and Results

The methodology is applied using the following parameters:

| Parameters | Values |
|---|---|
| Filter cutoff frequencies | 0 and 2.5 kHz |
| Number of samples N of the analysis window | 48 points |
| Discrete frequencies considered k | 1 |
| sCROP extraction threshold | 10% |
| eCROP extraction threshold | 10% |

Figure 3:
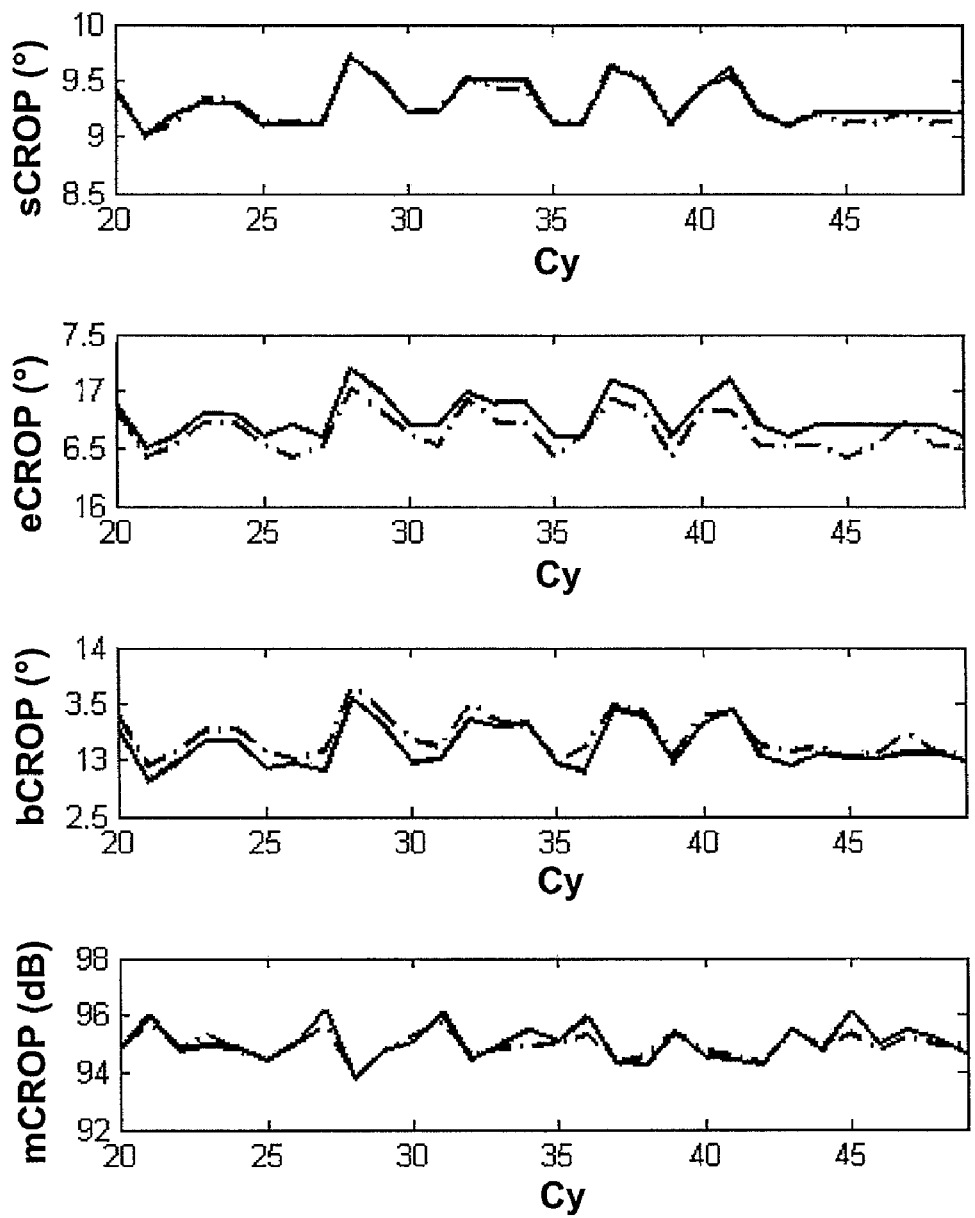
FIG. 3 illustrates the four indicators obtained: in full line, the indicators extracted from the pressure signal and, in dotted line, those obtained from the accelerometric signal.

In order to ascertain the validity of the indicators extracted from the accelerometric signal, the methodology has also been applied to the cylinder pressure signal, considered to be the reference signal by experts. FIG. 3 shows the indicators obtained from the pressure signal (full line) and from the accelerometric signal (dotted line) for an engine speed of 1500 rpm. The value of these indicators (crank angle value in FIG. 3) is given as a function of the engine cycle (Cy) in FIG. 3. It can be observed that the values obtained for these indicators are very close and that it is therefore possible to do without the pressure detector.

The method according to the invention has been presented by taking the example of vibration signal processing. It turns out that it can also be implemented using other types of signals associated with the combustion phenomenon, such as the pressure recorded in the cylinder or ionization current signals, which comprise oscillating components.

ADVANTAGE OF THE INVENTION

The method allows real-time access to a set of combustion state indicators without requiring direct measurement of the cylinder pressure with a costly instrumentation detector. Thus, at the end of an engine cycle, the combustion state indicators are available and they can be used to make a diagnosis of the previous cycle on the cylinder considered, then to modify (if necessary) the injection parameters so as to guarantee stability of the next combustion, for any cylinder, and its accordance with the reference point (reaction initiation, combustion duration and noise for example). The method involves advantages that are essential for efficient engine control:

the method is independent of the acquired data sampling type (angular sampling, temporal sampling);

the method is based on no combustion phenomenon periodicity hypothesis. Thus, the random aspect of the combustion phenomenon, which is known, can be perfectly apprehended;

the method of extracting the combustion state indicators from the time-frequency analysis is a method focused on the maximum of the combustion phenomenon. It achieves energy integration over an entire angular window focused on the combustion. Thus, the extraction method is hardly sensitive to noise and it provides combustion state indicators that are very similar to the indicators that could be obtained with the reference signal, that is the cylinder pressure signal;

the method provided is fast because it does not require many real-time operations, thus the time-frequency analysis that determines the energy of a frequency for a given sample only requires four elementary operations; and finally, because of its simplicity, there are few indicators and they are very simple to determine.

The time-frequency analysis of the method, carried out sample by sample (in contrast with FFT calculation on an already acquired set of samples), requires few operations because only a limited number of frequencies is taken into account, unlike conventional methods using fast Fourier transforms that calculate all the frequencies of the signal. It should be noted that frequency analysis of a signal can be costly in terms of calculating time and inadequate for real-time processing. Here, the method provided is both precise and fast. Furthermore, recursive frequency filtering can be associated with the recursive formulation of the time-frequency analysis performed. The method is therefore very effective in a real-time environment where calculation speed and memory space are essential parameters.

Furthermore, the method according to the invention does not depend on the nature of the combustion or on the detector technology used. The adjustment parameters provide good adaptability of the method to various engine/detector configurations.

The invention claimed is:

1. A method for determining indicators of a combustion state of an internal-combustion engine, wherein a signal correlated with a combustion phenomenon is acquired in form of a series of samples, a frequency band correlated with the combustion is determined by carrying out a time-frequency analysis of the signal, a number k of frequencies belonging to the frequency band is selected comprising:

a) after acquisition of a first sequence of N first samples: filtering the first sequence in said frequency band, by means of a band pass filter; and estimating at least k spectral components of the first sequence filtered by carrying out a discrete Fourier transform of the first filtered sequence;

b) then, for each new sample nN+1, constructing a new sequence of N samples, from the samples of the first sequence except a first sample but with the new sample, filtering the new sequence in the frequency band, by means of a recursive band pass filter, estimating at least k spectral components of the new filtered sequence, by a discrete Fourier transform of the filtered new sequence, calculated by applying a circular shift property of the Fourier transform; and c) determining combustion state indicators from the estimated spectral components.

2. A method as claimed in claim 1, wherein the combustion state indicators are determined after acquisition of p sequences, comprising:

defining, for each sequence, a value combining the k spectral components;

determining an extreme of p values combining the spectral components of the p sequences; and determining the combustion state indicators from the extreme.

3. A method as claimed in claim 2, wherein the value combining the spectral components corresponds to a sum of the spectral components of a sequence.

4. A method as claimed in claim 1, wherein the signal is acquired as a function of time.

5. A method as claimed in claim 1, wherein the signal is acquired as a function of crank angle.

6. A method as claimed in claim 1, wherein k frequencies are selected in ranges between 1 and 10.

7. A method as claimed in claim 2, wherein k frequencies are selected in ranges between 1 and 10.

8. A method as claimed in claim 1, wherein the signal represents a pressure within cylinders of the engine, acquired by pressure detectors in the engine.

9. A method as claimed in claim 1, wherein the signal is an ionization current signal.

10. A method as claimed in claim 7, wherein the combustion state indicators represent at least one of the following phenomena: start of an oscillating phenomenon associated with a combustion phase, an end of an oscillating phenomenon associated with a combustion phase, an energy barycentre of an oscillating phenomenon, and a magnitude of an oscillating phenomenon.

11. A method as claimed in claim 1, wherein engine parameters are modified according to the combustion state indicators to control the combustion of the engine.

12. A method as claimed in claim 2, wherein the signal is acquired as a function of time.

13. A method as claimed in claim 3, wherein the signal is acquired as a function of time.

14. A method as claimed in any one of claim 2, wherein a signal is acquired as a function of crank angle.

15. A method as claimed in any one of claim 3, wherein a signal is acquired as a function of crank angle.

16. A method as claimed in claim 2, wherein k frequencies are selected in ranges between 1 and 10.

17. A method as claimed in claim 3, wherein k frequencies are selected in ranges between 1 and 10.

18. A method as claimed in claim 4, wherein k frequencies are selected in ranges between 1 and 10.

19. A method as claimed in claim 5, wherein k frequencies are selected in ranges between 1 and 10.

20. A method as claimed in claim 2, wherein the signal is a vibration signal acquired by means of a vibration detector of the engine.

* * * * *